June 6, 1950        A. F. PITYO ET AL        2,510,215
METHOD OF FORMING HEMISPHERICAL GLOBE SECTIONS
Filed May 12, 1947        2 Sheets-Sheet 1
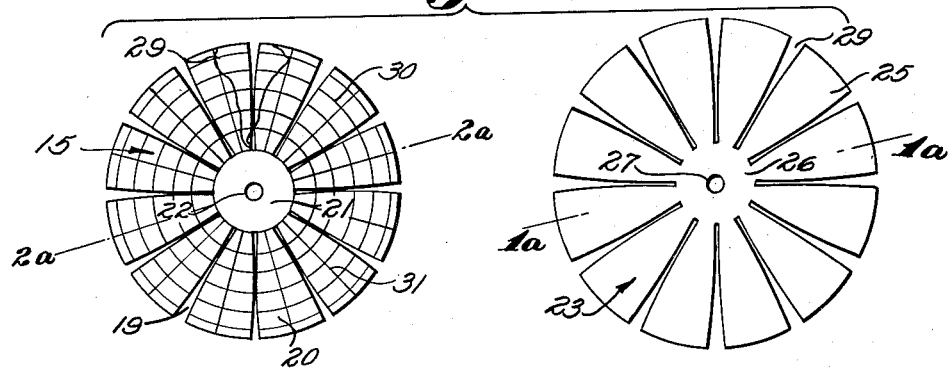
*Fig. 1.*
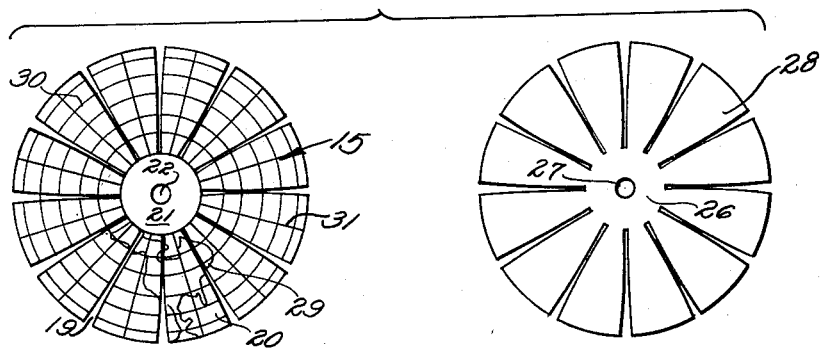
*Fig. 2.*
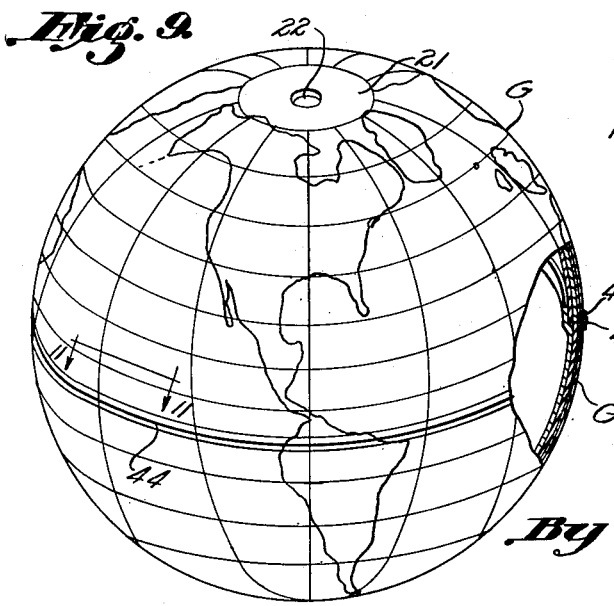
*Fig. 9.*
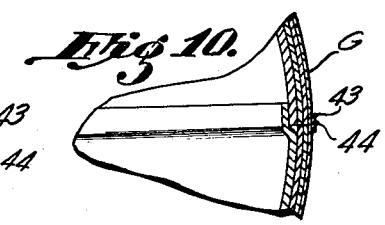
*Fig. 1a.*
*Fig. 2a.*
*Fig. 10.*
Inventors:
ALBERT F. PITYO
HARRY BUTTERFIELD
By
Attorney

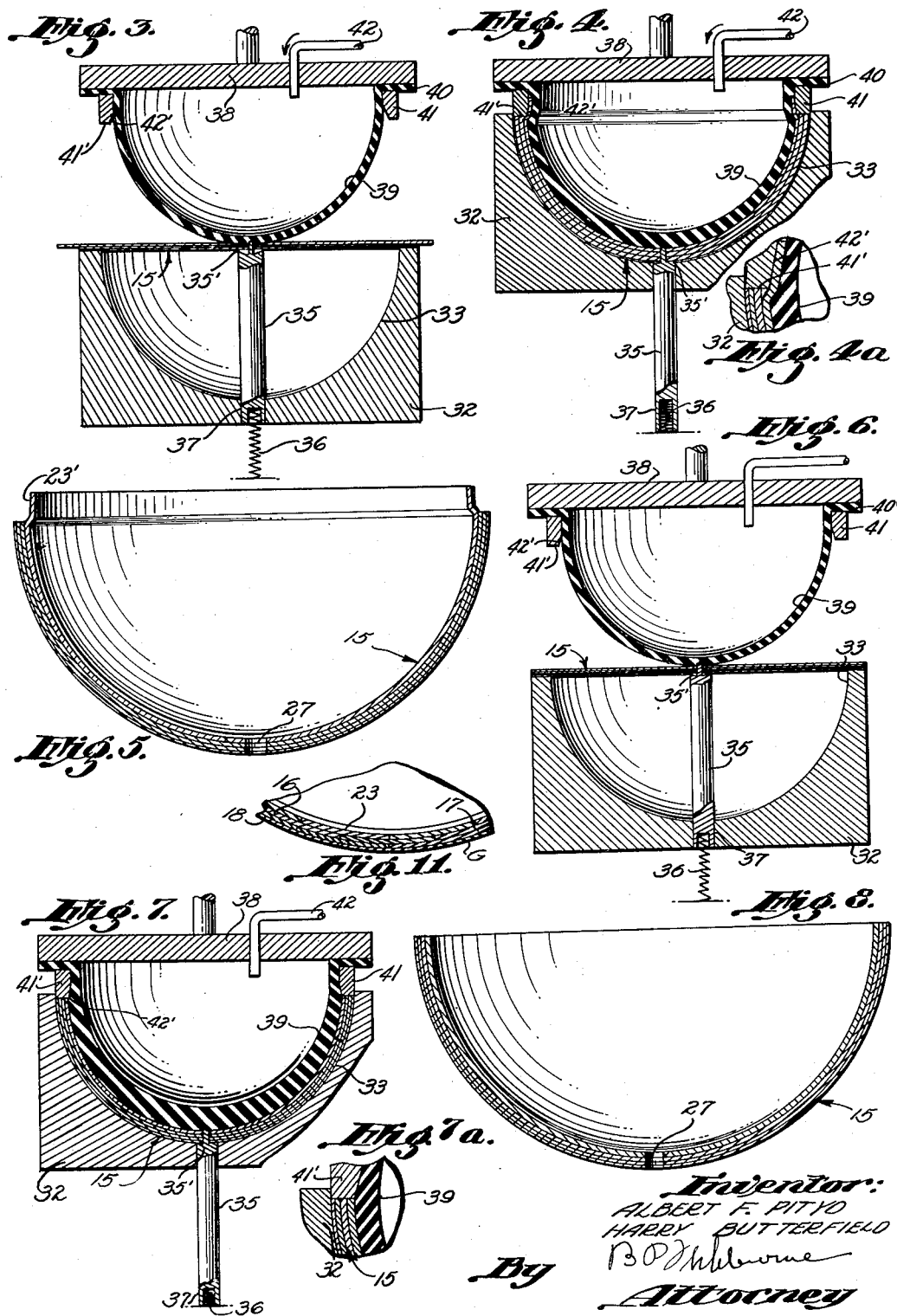

Patented June 6, 1950

2,510,215

UNITED STATES PATENT OFFICE 2,510,215

METHOD OF FORMING HEMISPHERICAL GLOBE SECTIONS

Albert F. Pityo, Clifton, and Harry Butterfield, Maplewood, N. J.

Application May 12, 1947, Serial No. 747,574

4 Claims. (Cl. 154—110)

Our invention relates to a method of producing geographical globes or the like.

An important object of the invention is to provide a method for producing substantially hemispherical globe sections, having accurately formed meeting edges, for proper assemblage.

A further object of the invention is to provide a method for pressing or forming the edge of the globe section for affording an accurate meeting edge while it is being subjected to heat and pressure.

A further object of the invention is to provide a method for forming an accurate meeting edge on one globe section and an inner extension, to enter the companion globe section.

In the accompanying drawings, forming a part of this application, and in which like numerals are employed to designate like parts throughout the same, Figure 1 are plan views of blanks used in producing one globe section, Figure 1a is a transverse section taken on line 1a—1a of Figure 1, Figure 2 is a similar view of blanks used in forming companion globe sections, Figure 2a is a similar view taken on line 2a—2a of Figure 1, Figure 3 is a central vertical longitudinal section through apparatus used in the practice of the method for forming one globe section, the yielding pressure element being in the outer position, Figure 4 is a similar view showing the yielding pressure element moved to the inner position, Figure 4a is a view similar to Figure 4, upon an enlarged scale and parts broken away, Figure 5 is a central vertical section through the formed globe section produced by the operations shown in Figures 3 and 4, Figure 6 is a central vertical section through apparatus for producing a companion globe section, showing the yielding internal pressure element in the raised position, Figure 7 is a similar view showing the yielding internal pressure element in the lowered position, Figure 7a is a view similar to Figure 7, upon an enlarged scale, parts broken away, Figure 8 is a central vertical section through the globe section produced by the apparatus shown in Figures 6 and 7, Figure 9 is a perspective view of a globe formed from the assembled globe sections, parts in section, Figure 10 is an enlarged fragmentary vertical section through the assembled globe sections, Figure 11 is a horizontal section taken on line 11—11 of Figure 9.

Each substantially hemispherical globe section G includes an outer circular blank 15, including an inner layer 16, formed of paper, such as cardboard, and an intermediate layer 17 formed of smooth or dense paper, and an outer transparent protecting or covering layer 18 formed of plastics material, such as cellulose acetate. These several layers are permanently secured together by a suitable adhesive, such as cement or the like, prior to the stamping of the blank. The blank 15 is stamped circular and radial openings 19 are formed, separating radial sections 20. There is a central portion 21 and a central opening 22. The blank 15, Figure 1, is employed in producing the lower hemispherical globe section G, Figure 9. The numeral 23 designates an inner blank, formed of paper, such as cardboard. This inner blank 23 is identical in shape with the blank 15 except that it has a larger diameter. The blank 23 is stamped circular and has radial openings 24 providing radial sections 25 and has a central portion 26 and a central opening 27.

The blank 15, in Figure 2, is employed to form the upper hemispherical globe section G, Figure 9, and is used with a circular cardboard blank 28, identical with the blank 23, except that the blank 28 has substantially the same diameter as its companion blank 15.

The blank 15, Figure 1, included in the lower hemispherical globe section G, has map designations 29 and horizontal and vertical lines 30 and 31. These designations and lines are fixed to the radial sections 20 and are movable therewith. The blank 15, Figure 1, has the geographical designations for the southern hemisphere, while the blank 15, Figure 2, has the geographical designations for the northern hemisphere, as is obvious. The blanks 15 of Figures 1 and 2 are otherwise identical.

We will now describe the method of forming the lower hemispherical globe section G, Figures 3, 4, 5, and 9. In these figures, the numeral 32 designates a rigid mold, formed of metal or the like, having a spherically curved mold cavity 33 leading at its top into a cylindrical cavity 34. The cylindrical cavity 34 need only be about three-sixteenths of an inch deep. The numeral 35 designates a reciprocatory guide plunger, moved upwardly by a spring 36. This plunger has a pin 35'. This plunger is vertical and slides within an opening 37 and is concentric with the cylindrical cavity 34. Coacting with the mold 32 is a vertically movable plunger head 38, raised and lowered by any suitable means, and carrying a flexible or yielding hollow plunger 39, formed of rubber or the like, and having a marginal portion 40 arranged between the plunger head 38 and a forming ring 41, formed of metal. The ring 41 is rigidly secured to the plunger head 38 by any suitable means. The ring 41 has a lower smooth flat straight face 41' and an inner vertically inclined face 42'. A pipe 42 leads into the yielding plunger 39 to supply a liquid under pressure thereto, this pipe being equipped with a suitable valve, not shown. The apparatus shown in Figures 6 and 7 is identical with that shown in Figures 3 and 4, or the same apparatus.

In the practice of the method for producing the lower hemispherical globe section G, Figures 3, 4, 5, and 9, the blank 15, Figure 1 is placed upon the top of the mold 32 with its outer layer 18 lowermost, and the blank 23 is positioned upon the blank 25. The radial sections of these two blanks are arranged to break joint, Figure 11. The pin 35' of the plunger 35 passes through the openings 22 and 27. The blanks 15 and 23 may have their contacting faces coated or impregnated with an adhesive, such as a plastics material. This plastics material is preferably a thermosetting compound, such as a phenol formaldehyde resin. This resin may be only partly cured and dissolved in alcohol. The liquid plastics material may be applied to these faces by means of a brush, or by spraying, or the parts may be immersed into the liquid material. When immersion is used the blanks are thoroughly impregnated with the liquid material and all faces thereof are coated. The liquid plastics material may be applied to the faces and allowed to dry before the blanks are stamped or before the pressure and heat treatment, either in pre-forming the globe sections or in the final setting of the thermosetting compound for producing the completed globe.

While it is preferred to use a thermosetting compound as an adhesive, we may use a thermoplastic compound, or other adhesive.

The plunger head 38 is moved downwardly and the yielding plunger 39 is now under slight pressure to hold it distended. The yielding plunger 39 forces the blanks 15 and 23 into the mold cavity 33, Figure 3, while the plunger 35 guides these blanks into the mold cavity and retains the centers of these blanks concentric with the open end of the mold cavity. The blanks are formed into the lower hemispherical globe section. When the plunger head 38 moves downwardly, the lower end of the forming ring 41 enters the cylindrical cavity 34 and its smooth lower end face 41' contacts with the upper or meeting edge of the formed globe section. The face 41' has a width equal to the combined width of the assembled blanks 15 and 23, and the inclined face 42' will deflect the projecting end 23' of the blanks 23 inwardly. This projecting end 23' forms a reenforcing or connecting band, as will be described. The plunger head 38 is now held in the lower pressure and liquid under pressure supplied through the pipe 42 into the yielding plunger 39. This yielding plunger now exerts a yielding pressure upon the formed blanks 15 and 23 and this pressure is preferably from 150 to 200 pounds per square inch. While the formed globe section is being subjected to this pressure to partly cure the thermosetting plastics material, it is subjected to a heat treatment of about 170° F., which is effected by heating the mold 32. This pressure and heat treatment is continued for about three minutes and is terminated short of the complete setting of the thermosetting compound. During these operations, the smooth end or face 41' of the forming ring 41 is contacting with the free or meeting edge of the formed globe section, and this ring 41 serves to accurately shape or form this edge, so that it will properly engage with the meeting edge of the companion globe section. After this heat and pressure treatment the pre-formed lower globe section is removed from the mold cavity and will retain its shape as the thermosetting compound is sufficiently strong or stiff for this purpose.

In forming the companion or upper globe section G, Figures 6, 7, 8, and 9, the blank 15, Figure 2, is arranged upon the top of the mold 32, Figure 8, and the layer 18 is arranged lowermost. The blank 28 is placed upon the top of the blank 15. The contacting faces of these blanks are coated with the thermosetting compound or other adhesive, and arranged to break joint, as described in connection with the blanks 15 and 23 of Figure 1. The plunger head 38 is now moved downwardly and the plunger 39 is held distended by suitable pressure and the blanks will be forced into the mold cavity 33 and formed into hemispherical upper globe section G. The forming ring 41 moves down and has its smooth face 41' pressed against the free or meeting edge of the formed globe section. The face 41' is of the same thickness as the combined thickness of the blanks 15 and 28. The plunger head is now held in the lowered position and a liquid under pressure introduced into the yielding plunger 39 to cause this yield-plunger to exert a pressure upon the formed globe section of about 150 to 200 pounds per square inch. During this pressing action, the formed blanks are being heated to about 170° F. During this pressure and heat treatment, the forming ring 41 is pressing down upon the meeting or free edge of the formed globe section, to accurately shape or form such meeting edge, so that it will properly set upon the meeting edge of the companion globe section. The pressure and heat treatment is continued for about three minutes and terminating short of the complete setting of the thermosetting compound. After this treatment, the formed upper globe section is removed from the mold cavity and will retain its shape, as the partly set thermosetting compound is sufficiently strong or stiff for this purpose.

The upper mold section is now assembled upon the lower mold section, with their free edges meeting and the end 23' will enter the open end of the upper mold section. This end forms a reenforcing or connection band, extending across the meeting edges of the globe sections. The outer face of the band 23' is coated or impregnated with the adhesive, such as the thermosetting compound. The assembled globe sections are now introduced into hemispherical mold cavities of rigid mold sections and these hemispherical mold cavities may have the same diameter as the mold cavity 33. The assembled globe sections held within these mold cavities are again subjected to an internal yielding pressure of about 150 to 200 pounds per square inch and to a heat treatment of about 170° F. for about three minutes, to complete the setting of the thermosetting compound. This internal yielding pressure will cause the band or end 23' to be securely anchored to the upper globe section and the globe sections will form a unitary globe. If the blanks are sufficiently impregnated with the thermosetting compound, all meeting edges will be bonded together. After the thermosetting compound has completely set, the completed globe is removed from the mold sections. Since the globe sections are subjected to a yielding internal pressure, within the hemispherical mold cavities of rigid molds, the exterior diameter of the mold sections is maintained constant, and any variation in thickness of the blanks, will produce a variance in the internal diameter of the globe sections. Since the exterior diameters are maintained constant, the map parts, lines or the like, when accurately printed on the blanks will register.

After the mold sections are assembled and removed from the mold cavities, Figure 9, a transparent ribbon 43 is secured to the globe sections at their meeting edges and this transparent ribbon has an opaque stripe 44 for covering the meeting edges.

It is to be understood that the form of our invention herewith shown and described is to be taken as a preferred example of the same, and that various changes in the size, shape, and arrangement of parts may be resorted to without departing from the spirit of our invention or the scope of the subjoined claims.

Having thus described our invention, what we claim is:

1. The method of forming hemispherical globe sections, comprising assembling outer and inner circular paper blanks having radial sections in concentric relation and having an adhesive at the meeting faces of such blanks, the inner blank having the larger diameter, the radial sections of the outer blank having map parts formed thereon and movable therewith, moving the assembled blanks into a hemispherical cavity of a rigid mold to form the assembled blanks into a hemispherical globe section and causing the open end of the inner formed blank to project outwardly beyond the free edge of the outer formed blank, and subjecting such free edge of the outer formed blank to a forming pressure and bending the adjacent projecting end of the inner blank inwardly, while subjecting the formed blanks to an internal yielding pressure in the presence of heat.

2. The method of forming hemispherical globe sections, comprising assembling outer and inner circular paper blanks having radial sections in concentric relation and having an adhesive at the meeting faces of such blanks, the inner blank having the larger diameter, the radial sections of the outer blank having map parts formed thereon and movable therewith, arranging the assembled blanks in a hemispherical cavity of a rigid mold to form the assembled blanks into a hemispherical globe section and causing the open end of the inner formed blank to project outwardly beyond the free edge of the outer formed blank, and subjecting such free edge of the outer formed blank to a forming pressure at a point spaced axially from the free edge of the inner blank, while subjecting the formed blanks to an internal yielding pressure in the presence of heat.

3. The method of forming hemispherical globe sections, comprising introducing into a hemispherical cavity of a rigid mold outer and inner circular paper blanks having radial sections and arranged in concentric relation and having an adhesive at the meeting faces of such blanks, the inner blank having the larger diameter, the radial sections of the outer blank having map parts formed thereon and movable therewith, subjecting the blanks to an internal yielding pressure in the presence of heat to form the same into a hemispherical globe section and causing the open end of the inner formed blank to project outwardly beyond the free edge of the outer formed blank, and substantially simultaneously subjecting such free edge of the outer formed blank to a forming pressure and bending the adjacent projecting end of the inner blank inwardly.

4. The method of forming hemispherical globe sections, comprising introducing into a substantially hemispherical cavity of a rigid mold outer and inner circular paper blanks having radial sections and arranged in concentric relation and having an adhesive at the meeting faces of such blanks, the inner blank having the larger diameter, the radial sections of the outer blank having map parts formed thereon and movable therewith, subjecting the blanks to an internal yielding pressure in the presence of heat to form the same into a hemispherical globe section and causing the open end of the inner formed blank to project axially beyond the free edge of the outer formed blank, subjecting the free edge of the outer blank to a forming pressure which is substantially perpendicular to such free edge and subjecting the outer face of the inner blank to an inwardly wedging action.

ALBERT F. PITYO.
HARRY BUTTERFIELD.

REFERENCES CITED

The following references are of record in the file of this patent:

UNITED STATES PATENTS

| Number | Name | Date |
|---|---|---|
| 84,398 | Weissenborn | Nov. 24, 1868 |
| 704,748 | Kempshall | July 15, 1902 |
| 930,316 | Rehm | Aug. 3, 1909 |
| 2,386,821 | Tardiff | Oct. 16, 1945 |